(12) United States Patent
Yeh et al.

(10) Patent No.: US 9,036,647 B2
(45) Date of Patent: May 19, 2015

(54) METHOD AND APPARATUS FOR NETWORK SECURITY

(71) Applicant: Alcatel-Lucent USA Inc., Murray Hill, NJ (US)

(72) Inventors: Chiang Yeh, Sierra Madre, CA (US); Lawrence Helmerich, Sylmar, CA (US); Sindhu K. Mohandas, Thousand Oaks, CA (US); Abhishek Sinha, Woodland Hills, CA (US); Gregory G. Page, Sandy, UT (US); Peter Ott, Atlantic Highlands, NJ (US); Andrew Ferreira, Holmdel, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 132 days.

(21) Appl. No.: 13/727,978

(22) Filed: Dec. 27, 2012

(65) Prior Publication Data

US 2014/0185622 A1 Jul. 3, 2014

(51) Int. Cl.
*H04L 12/721* (2013.01)
*H04L 12/713* (2013.01)
*H04L 29/06* (2006.01)

(52) U.S. Cl.
CPC ............ *H04L 45/12* (2013.01); *H04L 45/586* (2013.01); *H04L 63/0209* (2013.01)

(58) Field of Classification Search
None
See application file for complete search history.

(56) References Cited

U.S. PATENT DOCUMENTS

| 2003/0174719 A1* | 9/2003 | Sampath et al. ............ 370/402 |
| 2004/0109457 A1* | 6/2004 | Johnson et al. ............ 370/401 |
| 2009/0296571 A1* | 12/2009 | McCourt ................... 370/225 |
| 2012/0216275 A1* | 8/2012 | Boscolo et al. ............ 726/13 |

* cited by examiner

*Primary Examiner* — John Blanton
*Assistant Examiner* — Tito Pham
(74) *Attorney, Agent, or Firm* — Stephen J. Wyse (57) ABSTRACT

A method of securely routing data traffic between communication networks. In an integrated security device, a host router supports a virtual router that peers with VRF (virtual routing and forwarding) instances associated with participating networks on the host router. Each VRF instance preferably runs its own dynamic routing protocol and determines when received data traffic may be directly forwarded from one network to another and when it must be forwarded to an OE (offload engine) for enforcement of security policies or NAT (network address translation) processing.

18 Claims, 10 Drawing Sheets

METHOD AND APPARATUS FOR NETWORK SECURITY

TECHNICAL FIELD

The present invention relates generally to the field of communication networks, and, more particularly, to a method and apparatus for providing network security in an environment where routing between a number of networks of various protection levels is necessary.

BACKGROUND

The following abbreviations are herewith defined, at least some of which are referred to within the following description of the state-of-the-art and the present invention.
ACL Access Control List
AOS Alcatel Operating System
CMM Chassis Management Module
DMAC Destination MAC (address)
GE Gigabit Ethernet
IP Internet Protocol
IP Sec Internet Protocol Security
LAN Local Area Network
MAC Media Access Control
NAT Network Address Translation
NIC Network Interface Card (Controller)
OE Offload Engine
OSPF Open Shortest Path First
PCI Peripheral Component Interface
PCIe PCI express
WAN Wide Area Network
VID VLAN ID
VRF Virtual Routing and Forwarding
VRRP Virtual Router Redundancy Protocol
XAUI 10 Gigabit Attachment Unit Interface Computers and computing devices such as servers may be linked together to form communication networks. Such networks may be used for applications such as email, voice communication, and data sharing. Individual computing devices such as personal computers and tablets may access servers to store or retrieve data and use computing resources available there. In addition to the computing devices themselves, communications networks also typically include a number of bridges, switches, routers, and similar devices that facilitate moving data traffic from one part of the network to another.

User devices and servers at a particular location may be connected together to form a LAN, or local area network. Employees at a company or students at a university, for example, may in this way communicate with each other and share computing resources. At some location, more than one LAN may be in place and the various LANs may be connected at one or more routers that are capable of forwarding traffic from one LAN to another. The router may also route traffic from the LANs to an outside network, such as a WAN (wide area network). In this way, a user on one of the LANs may, for example, access the Internet or communicate with users at distant locations.

Unfortunately, providing a broad, almost universal access to communications poses some risks. Malicious users, sometimes referred to as hackers, may seek to infiltrate computer networks for the purpose of stealing or destroying data belonging to others or to affect the ability of their computers to function properly. This may be done by transmitting malware or viruses that cause the computer to function in a harmful manner not intended by their operators.

For this reason, security programs such as firewalls may be implemented to inspect data traffic at certain locations in an attempt to detect and eliminate harmful programs or data. A router where two or more networks such as WANs and LANs converge is an ideal place for such an application to run.

There are challenges, however. Not all of the traffic passing though the router needs to be screened, and there is a need to make efficient use of the computing resources of the router. As another example, some networks use private IP addresses and translation boundaries must be crossed although this will not affect all traffic passing through. These challenges are among those addressed by the present invention.

SUMMARY

The present invention is directed to a manner of routing data traffic between networks, and especially between networks having various requirements for security policies and IP address translation. In one aspect, the present invention is a method of routing data traffic between networks including receiving the data traffic from a source network and determining whether the data traffic may be directly forwarded to a destination network. Direct forwarding in most cases means that no IP address translation is necessary and minimal or no security protocols are implemented. The process continues, however, with forwarding the data traffic to an OE (offload engine) if it is determined that the data traffic may not be directly forwarded to the second network; and also includes forwarding the data traffic from the OE to the destination network.

The method may further include forwarding the data traffic directly to the destination network if it is determined that the traffic may be forwarded directly to the destination network or, on the other hand, inspecting the data traffic in the OE. An instance of OSPF is preferably running in association with the OE. In some embodiments, another dynamic routing protocol may be used instead, and in some cases static routing tables may suffice. The method may further include performing IP address translation, for example when the data traffic is traversing a NAT boundary at the security apparatus, that is, the router at which the present invention is being implemented.

In a preferred embodiment, the method further includes replacing a delineator associated with the data traffic after the data traffic has been forwarded to the OE. In this embodiment, the step of determining whether the data traffic may be directly forwarded to the destination network includes running a first instance of VRF, and the step of forwarding the data traffic from the OE to the destination network includes running a second instance of VRF. The replaced delineator is associated with the first VRF instance and it is replaced with a delineator associated with the second VRF instance. The delineator may be, for example, a VID or an MPLS label.

In forwarding the data traffic from the OE, packets may be forwarded to a packet processor in communication with the OE. For this purpose, an embedded routing header, for example a HiGig™ header, is added for forwarding the data traffic to the packet processor.

In another aspect the present invention is a security apparatus having a processor for executing program instructions stored in a non-signal memory device for performed the methods described above. In yet another aspect the present invention is the memory device containing the program instructions.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a security apparatus and a method of providing secure data routing for a computer network or networks such as LANs (local area networks). An exemplary intersection of several networks is shown in FIG. 1.

Figure 1:
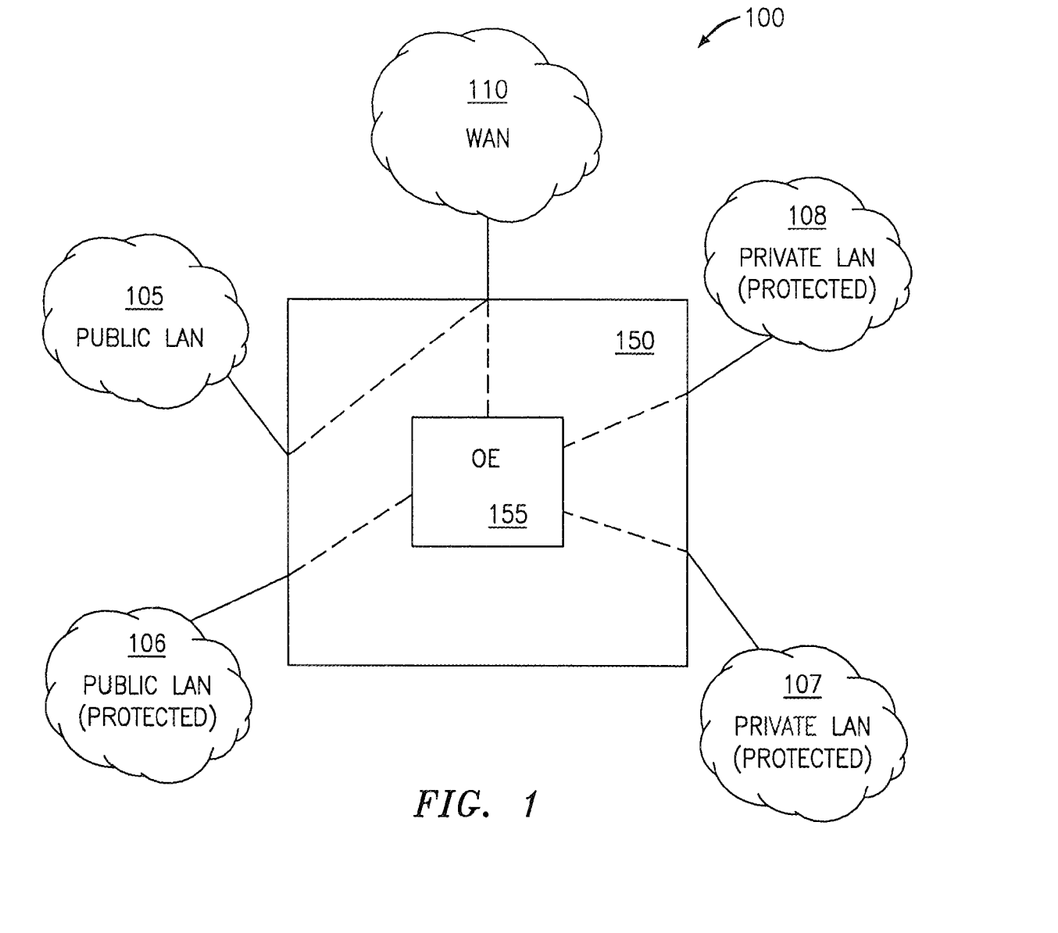
FIG. 1 is a schematic diagram illustrating an exemplary communications network in which embodiments of the present invention may be advantageously employed.

FIG. 1 is a schematic diagram illustrating an exemplary communications network 100 in which embodiments of the present invention may be advantageously employed. Note that network 100 is actually several networks that converge at a routing apparatus 150, which may be referred to as, for example, a router, switch, or gateway. Routing apparatus 150 is frequently implemented as a single circuit board (or "blade") mounted in a chassis. (In some cases a blade may include multiple circuit boards.) A number of such blades may be interconnected and function either individually or in concert with each other.

In the example of FIG. 1, there are four LANs 105 through 108 and a WAN (wide area network) 110. LANs 105 through 108 may be associated, for example, with a business enterprise, university, or government institution and function as a means for employees, students, or staff to communicate with each other. WAN 110 may be a carrier network though which users of LANs 105 through 108 may communicate with others outside of the enterprise for example to send or receive email, access the Internet, download data files, make telephone calls, and so forth. The enterprise may also be accessed by others outside the enterprise for similar reasons. As should be apparent, security is an important consideration in this environment.

Each of the exemplary networks 105 though 108 and 110 may be classified as public or private and protected or unprotected. In the context of this description, a public network is one for which the individual computers or other devices have an IP address that is addressable by the public at large, for example via WAN 110. A private network, in contrast, uses private IP addresses that may only be addressed by routing apparatus 150 or a related component that is itself directly addressable from outside the enterprise. This address translation, which takes place at what is sometimes referred to as the NAT (network address translation) boundary, enables the (private) IP addresses to be used, for example in both LAN 107 and LAN 108 and in the same fashion by other enterprises (not shown). Note, however, that in some cases IP addresses will not be re-used within an enterprise, for example LANs 107 and 108 may not have overlapping private IP addresses.

A network or entity referred to as protected is one for which the routing apparatus 150 enforces certain security protocols when processing data traffic addressed to (and in some cases from) the protected network or other entity. A firewall is one example. The application of security policy, however, is boundary-specific. Data traffic from WAN 110, for example, may be arriving from an unknown server through the Internet and so extra security measures are usually applied. In contrast, traffic that is simply being routed between protected private LAN 107 and protected private LAN 108 need not be subjected to the firewall or other security measures and the network resources that would have been allocated to those tasks are conserved.

In this exemplary network 100, the same is also true of traffic between the WAN 110 and unprotected public LAN 105, which may be for example a network provided for use by non-employees visiting the enterprise. In other words, from a security point of view LAN 105 is treated no differently in this example than the public WAN 110 and traffic is simply routed between the two networks by routing apparatus 150.

In the case of a protected LAN (or other entity, not shown), however, the data routing must be performed in a way to allow appropriate security protocols to be applied. Selected data traffic may be passed through OE (offload engine) 155, for example, so that security policies may be enforced. One way to do this, of course, is on a wire-by-wire basis or using simple layer-2 networking. It becomes more difficult, however, when the security apparatus must participate in a layer-3 network as a networking device. The routing apparatus is preferably capable of efficiently providing the appropriate service to each of the networks even if different treatment is given to traffic from or to the various networks.

One solution is to implement an integrated security device acting as a routing device connecting various layer-3 devices that are separated by VLAN. While this provides an integrated security device capable of enforcing network-specific security policies, in and of itself it is not preferred. Simply separating layer-3 networks by VLAN may be unduly restrictive and makes it difficult to handle overlapping IP addresses. It may also make load sharing difficult and negatively impact availability. A preferred solution that is expected to provide greater flexibility in these areas will now be described.

Figure 2:
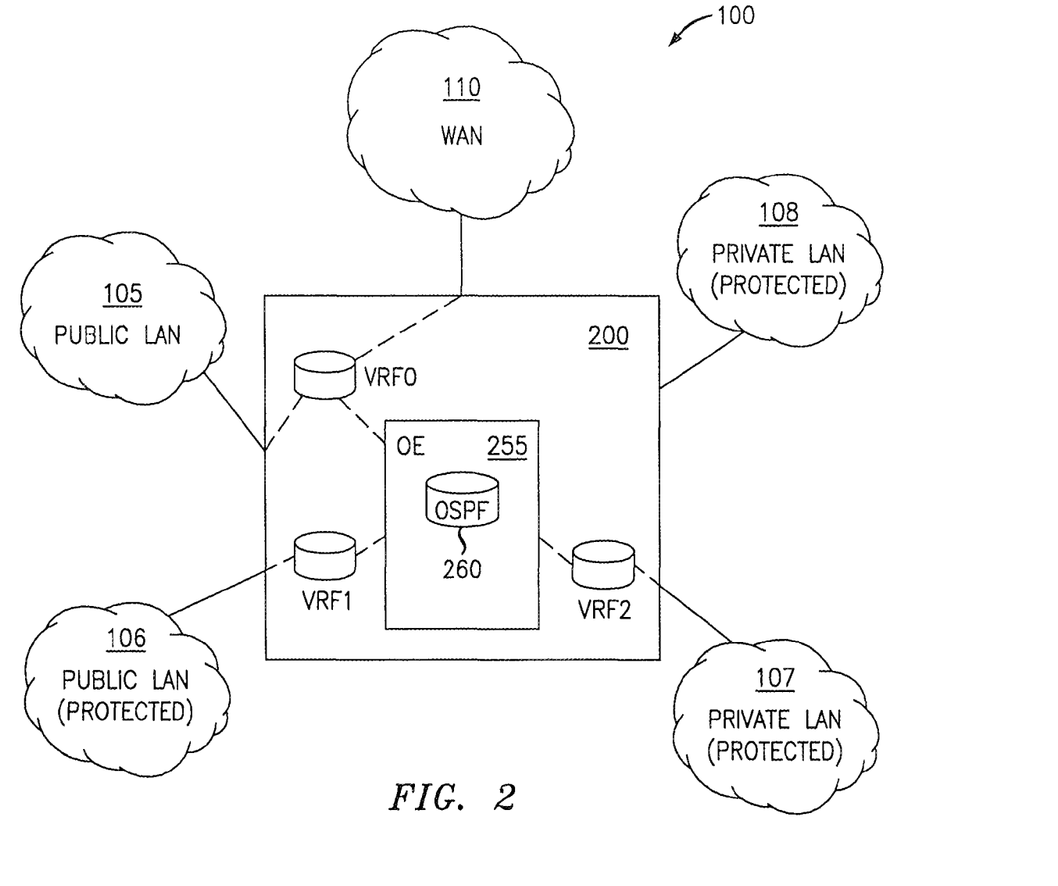
FIG. 2 is a simplified block diagram illustrating selected components of an integrated security apparatus configured to operate within the communications network of FIG. 1 according to an embodiment of the present invention.

FIG. 2 is a simplified block diagram illustrating selected components of security apparatus 200 configured to operate within network 100 according to an embodiment of the present invention. The network 100 is characterized above in reference to FIG. 1. Security apparatus 200 similar to routing apparatus 150 (shown if FIG. 1) but configured to operate according to this embodiment. In accordance with this embodiment, participating networks are provided with their own VRF (virtual routing and forwarding) instance and each runs its own dynamic routing. (In some alternate embodiments, static routing tables may also be used.) In the embodiment of FIG. 2, VRF0 serves both public LAN 105 and WAN 110. Since public LAN 105 is in network 100 not protected, data traffic between public LAN 105 and WAN 110 may be routed according to the routing tables of VRF0. This traffic is not routed to the offload engine 255, and the security policies associated with the offload engine are not applied.

In this embodiment, VRF1 is associated with the public LAN 106, which is a protected network, and VRF2 is associated with private LAN 107, which is also a protected network. Although for convenience no separate VRF instance is shown in association with LAN 108, which is also a private, protected network, it may be served by VRF2 or an analogous VRF that functions in the same manner and includes analogous routing tables.

In the embodiment of FIG. 2, security apparatus 200 also includes an OE 255 configured to enforce security policies within network 100. OE 255 includes or is in communication with a processor, which in turn is in communication with a memory device (not separately shown). The memory device is a physical memory device or a physical device executing software instructions and is non-transitory in the sense of not being merely an electronic signal. Likewise, the processor of OE 255 is implemented in hardware or as software running on a hardware device, or both. The processor associated with OE 255 is configured to run an instance of OSPF (open shortest path first), a dynamic routing protocol specified in RFC 2328, or a similar routing function. (In alternate embodiments, a static routing function may also be used.)

Figure 10:
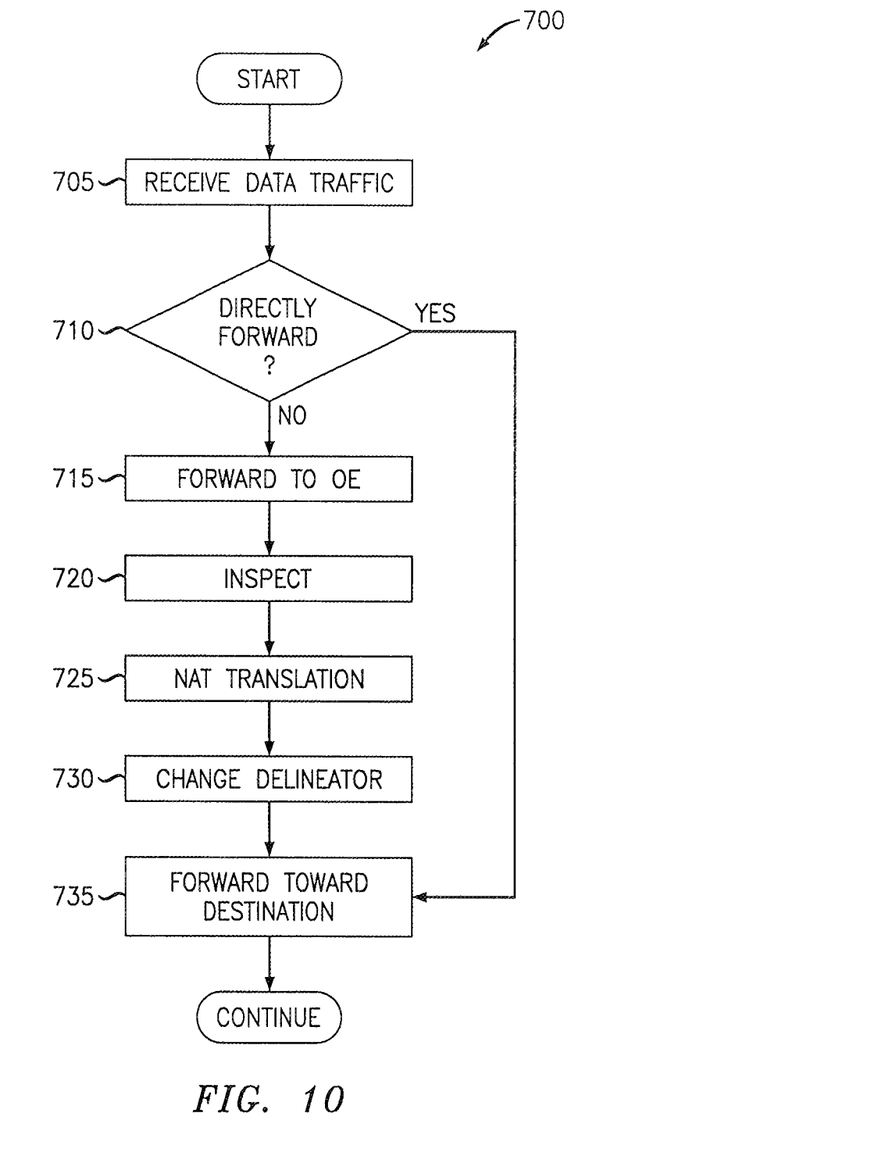
FIG. 10 is a flow diagram illustrating a method of routing data traffic in an integrated security apparatus according to an embodiment of the present invention.

The operation of security apparatus 200 within network 100 will now be described with reference to the process illustrating in FIG. 10. FIG. 10 is a flow diagram illustrating a method 700 of routing data traffic in an integrated security apparatus according to an embodiment of the present invention. At START it is presumed that the components necessary to performing the process are available and operational according to this embodiment, for example as shown in FIG. 2. The process then begins when data traffic is received (step 705) at a security apparatus. A determination is then made (step 710) whether the traffic may be directly forwarded. An example of this is data traffic from the WAN 110 and addressed to a destination in unprotected public LAN 105 (see, for example FIG. 3). This determination may be made, for example, by reference to a delineator in a data packet. Possible delineators may be VIDs (VLAN IDs) or MPLS (multi-protocol label switching) labels.

In this embodiment, if the data traffic may be directly forwarded, it is forwarded (step 735) to the device associated with its destination address. This does mean that the security protocols of the security apparatus need not be applied, but thereby reduces the burden on the OE 255. If, on the other hand, it is determined that the traffic may not be directly forwarded, then the data traffic is forwarded to an OE (step 715) of the security apparatus.

In the embodiment if FIG. 10, the packets of the data traffic are then inspected (step 720), and any number of security protocols may be implemented (not separately shown). The NAT translation (step 725) process is also performed, if necessary. (Necessity may be determined, for example, from the source and destination of the packet.) In this embodiment, a delineator in the data packet is then replaced (step 730), and the packet is then forwarded (step 735) toward its destination. The process continues for additional packets received. Various embodiments for different traffic situations may now be described.

Figure 3:
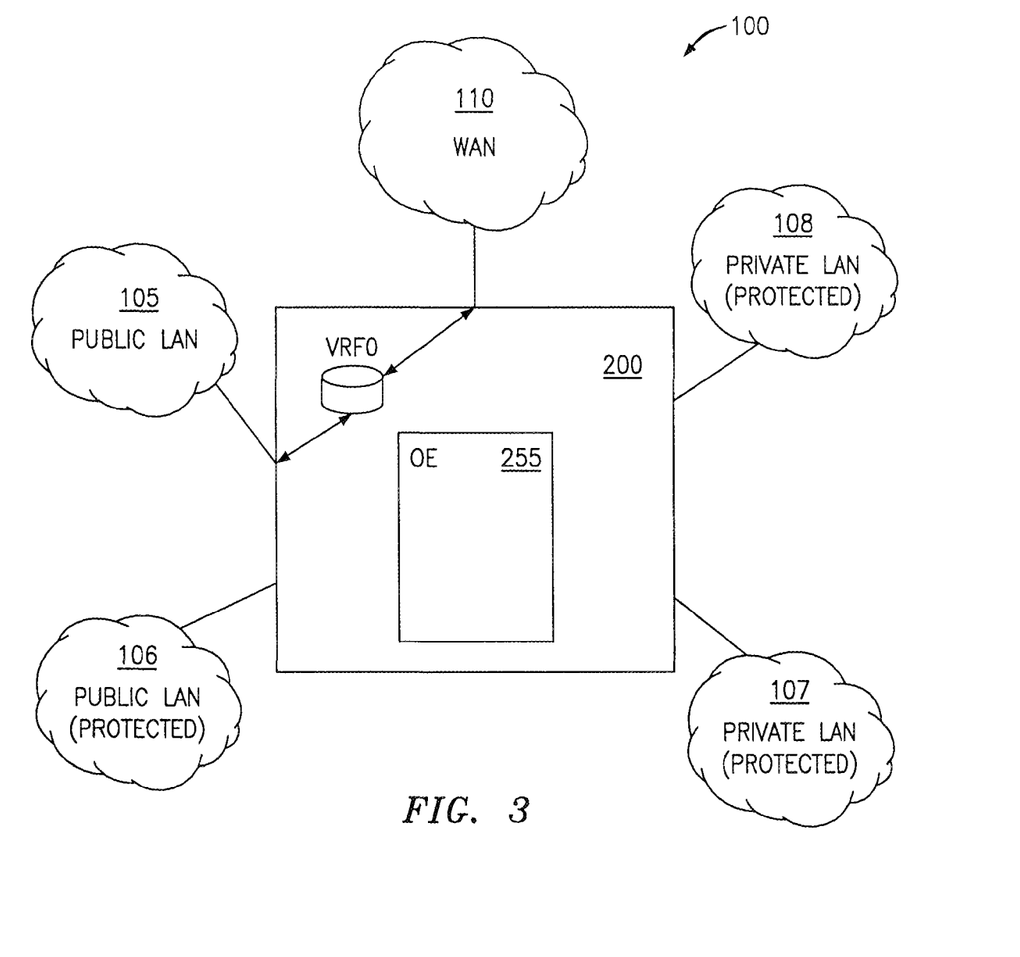
FIG. 3 is a simplified block diagram illustrating selected components of an integrated security apparatus configured to operate within the communications network of FIG. 1 according to an embodiment of the present invention.

FIG. 3 is a simplified block diagram illustrating selected components of security apparatus 200 configured to operate within network 100 according to an embodiment of the present invention. FIG. 3 shows the path take by data traffic traversing the security apparatus 200 while traveling between public WAN 110 and unprotected public LAN 105. In this embodiment, when data traffic is received from the WAN 110 and addressed to a device within LAN 105, the routing tables of VRF0 are referred to and the traffic is forwarded accordingly. Note that since public LAN 105 is unprotected, the OE 255 is not utilized and security policies are not enforced.

In the embodiment of FIG. 3, data traffic from LAN 105 and received at security apparatus 200 address for a destination via WAN 110 is handled analogously. The routing tables of VRF0 are referred to, and the traffic is forwarded accordingly. Again, neither LAN 105 nor WAN 110 is protected by security apparatus 200, and the OE 255 of security apparatus 200 is not utilized. In this case, the security apparatus 200 performs only its routing function. As should be apparent, it is presumed in the embodiment of FIG. 3 that a determination the data may be directly forwarded has been made (see, for example, FIG. 10 and the accompanying text, above).

Figure 4:
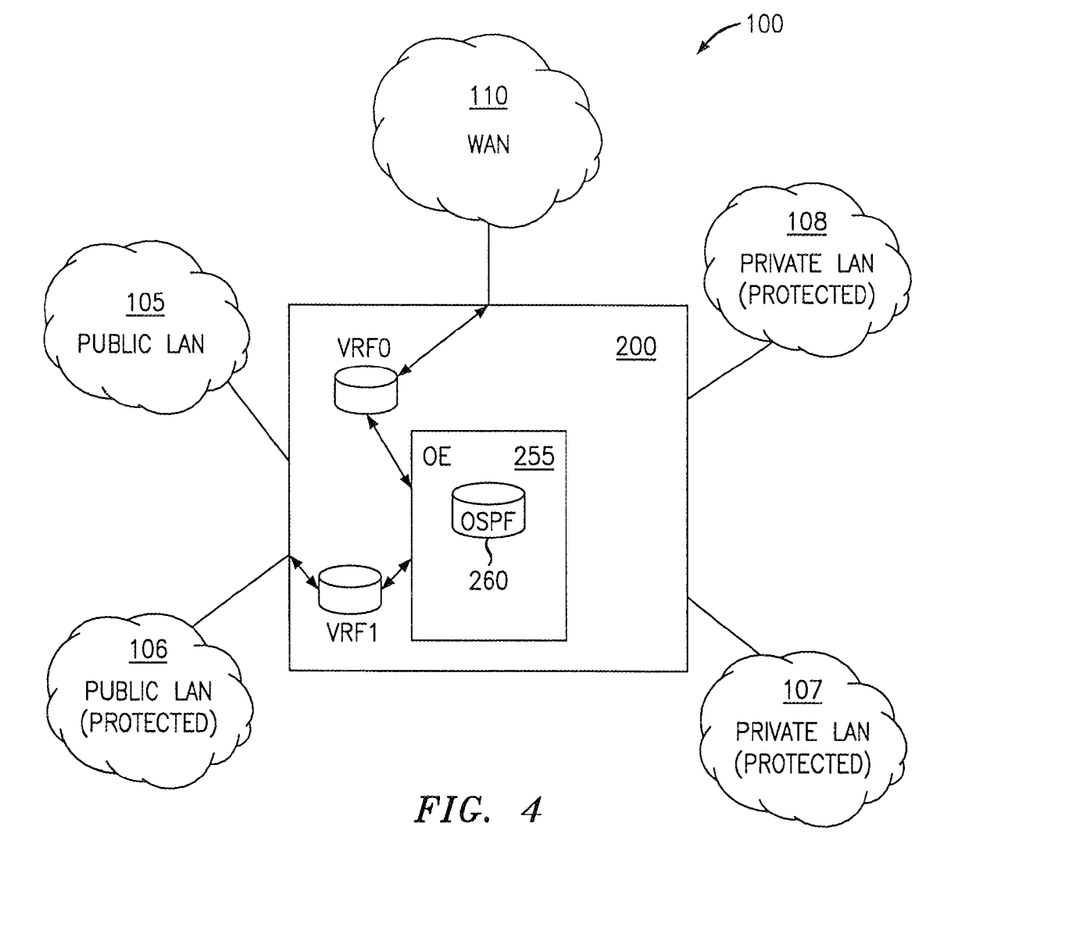
FIG. 4 is a simplified block diagram illustrating selected components of an integrated security apparatus configured to operate within the communications network of FIG. 1 according to an embodiment of the present invention.

This is of course not the case when traffic is addressed to a protected LAN of network 100. FIG. 4 is a simplified block diagram illustrating selected components of security apparatus 200 configured to operate within network 100 according to an embodiment of the present invention. FIG. 4 shows the path take by data traffic traversing the security apparatus 200 while traveling between public WAN 110 and protected public LAN 106. In this embodiment, when data traffic is received from the WAN 110 and addressed to a device within LAN 106, the routing tables of VRF0 are referred to and the traffic is forwarded to the OE 255. OE 255 is in this embodiment running an instance of OSPF (open shortest path first) 260 (as is each involved VRF instance). The OE 255/OSPF 260 inspects the traffic and, if appropriate, forwards the traffic to LAN 106 based on its internal routing tables. Upon receiving the redirected traffic at LAN 106, the routing tables of VRF1 are then referred to, and the traffic is forwarded to the appropriate device of public LAN 106. Since LAN 106 is a protected LAN, security policies may be enforced by the OE 255. (That is, suspect traffic may be dropped, although this is not shown in FIG. 4.) In the embodiment of FIG. 4, data traffic received from public LAN 106 follows an analogous process. When the data traffic from a device in LAN 106 is received in the security apparatus 200, the routing tables of VRF1 would forward the traffic to the OE 255/OSPF 260. The OE 255/OSPF 260 inspects the traffic and, if appropriate, forwards the traffic to WAN 110 based on its internal routing tables. Upon receiving the redirected traffic at WAN 110, the routing tables of VRF0 are then referred to, and the traffic is forwarded to the appropriate device of public WAN 110.

In this manner, data traffic passing between WAN 110 and protected public LAN 106 may be efficiently and quickly routed. Note that VRF0 and VRF1 do not interact except via OE 255. For (at least) this purpose, a unique logical port is preferably available for communication between the OE 255/OSPF 260 and a packet processor allowing each VRF to look up the routes for data packets. (See, for example, FIG. 9 and the accompanying text, below.) Generally speaking, they form a star network with OE 255/OSPF 260 as the hub. In addition, the system described above may often be implemented in an existing hardware configuration. In an alternate embodiment (not shown) more than one integrated security device may be implemented in a host router chassis. In that case, the security devices may form a dual star topology, with the VRF instances and run VRRP (virtual router redundancy protocol) among themselves. A preferred manner of implementing the integrated security apparatus of FIG. 4 will now be described in reference to FIGS. 5a and 5b.

Figure 5A:
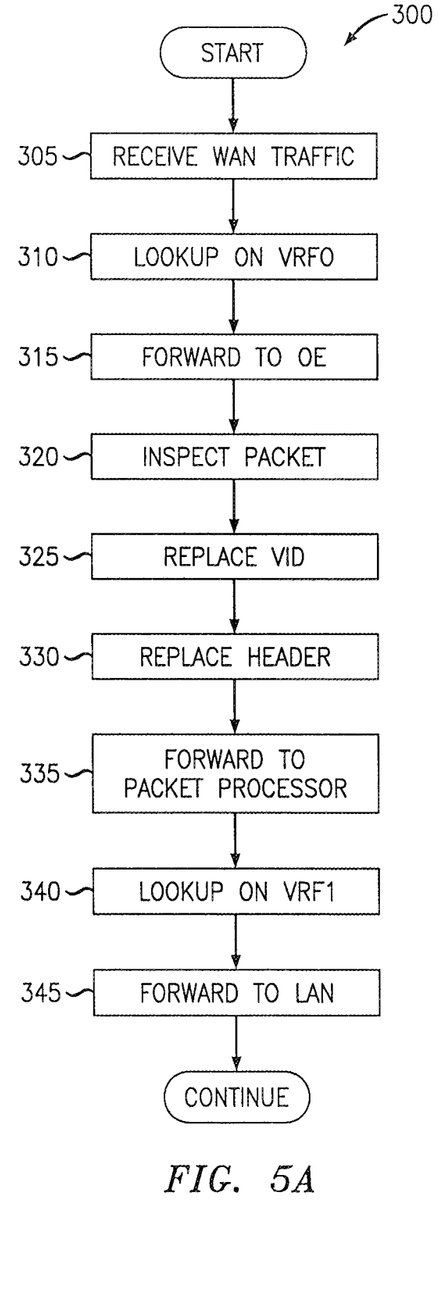
FIG. 5a is a flow diagram illustrating a method of routing data traffic in an integrated security apparatus according to an embodiment of the present invention.

FIG. 5a is a flow diagram illustrating a method 300 of routing data traffic in an integrated security apparatus according to an embodiment of the present invention. At START it is presumed that the components necessary to performing the process are available and operational according to this embodiment, for example as shown in FIG. 4. The process then begins when WAN 110 traffic is received at the security apparatus (step 305). This data traffic generally includes a plurality of data packets although for convenience the description here will at times focus on a representative packet. It is in this case presumed that the packet is received at a port associated with the WAN 110, and that the incoming data packet includes a DMAC matching the MAC address of the security apparatus and a VID matching VRF0. In this case, the packet is not directly forwarded to a device in a protected LAN.

In this embodiment, lookup is then performed using the routing tables of VRF0 (step 310). For data traffic from the WAN 110 that is destined for the protected LAN 106, the next hop is indicated to be the OE 255 of the security apparatus, and there is also an indication that L3 transformation is to be suppressed. Note that in alternate embodiments, suppression of L3 transformation may not be required. In the embodiment of FIG. 5a, the data packet is then forwarded (step 315) to the OE unmodified. According to this embodiment of the present invention, the OE is running an instance of OSPF (as is each virtual router running a VRF instance), which may act as a router internal to the security apparatus.

In the embodiment of FIG. 5a, the packet is then inspected (step 320) at the OE, and the VID of the data packet is replaced (step 325). Since the destination of the packet in this case is within LAN 106, the VID of VRF0 is replaced with the VID of VRF1, which as mentioned above is associated with LAN 106. As mentioned above, in other embodiments, a delineator other than the VID may be used, for example an MPLS label. In that case an analogous operation is performed. In the embodiment of FIG. 5a, the packet may then be forwarded to a packet processor (step 335) associated with the OE, where the routing tables of VRF1 are referred to (step 340). As alluded to above, a unique logical port connecting the OE and the packet processor is provided for this purpose. The packet may then be forwarded (step 345) according to the lookup results.

In this embodiment, forwarding to the packet processor at step 335 is accomplished by, in addition to changing the VID of the packet, adding an internal routing address (step 330). In a preferred embodiment (as shown in FIG. 5a), this includes adding an embedded routing header such as a HiGig™ header with the destination module and port matching that of the OE. If a HiGig™ link is not used, an analogous internal routing protocol may also be used. Note that if a HiGig™ link is used, HiGig™ lookup must be enabled.

The process then continues when additional data traffic addressed to a destination on LAN 106 is received from WAN 110. Of course, traffic may flow in the other direction as well, as described in reference to FIG. 5b.

Figure 5B:
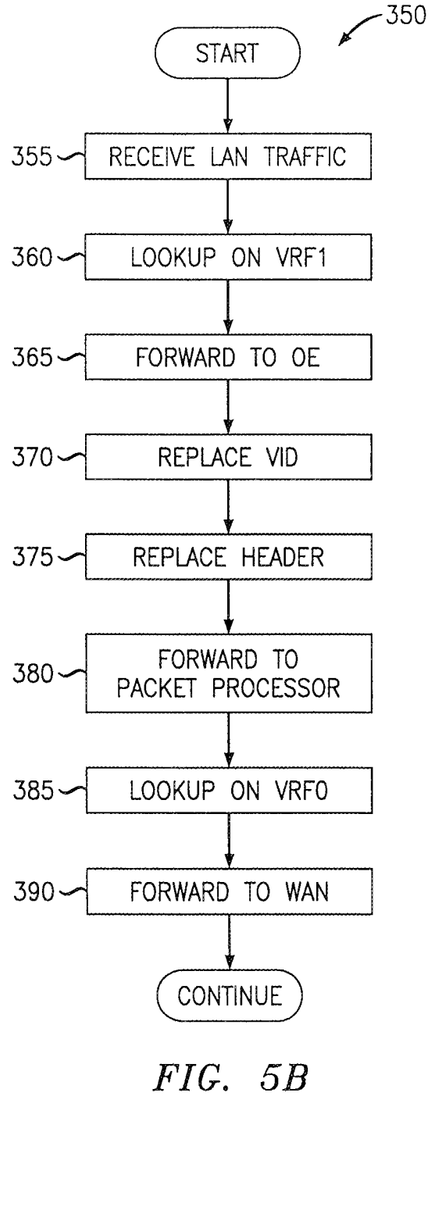
FIG. 5b is a flow diagram illustrating a method of routing data traffic in an integrated security apparatus according to an embodiment of the present invention.

FIG. 5b is a flow diagram illustrating a method 350 of routing data traffic in an integrated security apparatus according to an embodiment of the present invention. At START it is presumed that the components necessary to performing the process are available and operational according to this embodiment, for example as shown in FIG. 4. The process then begins when LAN 106 traffic is received at the security apparatus (step 355). These data traffic generally includes a plurality of data packets although for convenience this description will focus on a representative packet. For traffic received from a device in the LAN 106, it is presumed that the packet is received at a port associated with the LAN, and that the incoming data packet includes a DMAC matching the MAC address of the security apparatus and a VID matching VRF1.

In this embodiment, lookup is then performed using the routing tables of VRF1 (step 360). For data traffic from the public LAN 106 that is destined for the WAN 110, the next hop is indicated to be the OE of the security apparatus, and there is also an indication that L3 transformation is to be suppressed. Note that in alternate embodiments, suppression of L3 transformation may not be required. In the embodiment of FIG. 5b, the data packet is then forwarded (step 365) to the OE unmodified.

In the embodiment of FIG. 5b, the VID of the data packet is replaced (step 370). Since the destination of the packet in this case is within WAN 110, the VID of VRF1 is replaced with the VID of VRF0, which as mentioned above is associated with WAN 110. The embedded routing header is also replaced (step 375). As mentioned above, in other embodiments, a delineator other than the VID may be used, for example an MPLS label. In that case an analogous operation is performed. In the embodiment of FIG. 5b, the HiGig™ header destination and port are changed to that of the OE. The packet may then be forwarded to a packet processor (step 380) associated with the OE, where the routing tables of VRF0 are referred to (step 285). As alluded to above, a unique logical port connecting the OE and the packet processor is provided for this purpose. The packet may then be forwarded (step 390) according to the lookup results.

The process then continues when additional data traffic addressed to a destination on WAN 1106 is received from LAN 106. Of course, traffic may flow in the other direction as well, as described in reference to FIG. 5b.

Although traffic between LAN 106 and WAN 110 is specifically referred to above, it should be apparent that the methods of described above are applicable to any similar network configuration. In the event that the LAN in communication with the WAN (or other public network) is a private LAN, however, the network address translation must be accounted for. The following description that refers to FIGS. 6 and 7a and 7b will use private LAN 107 as an example and presume that LAN 107 is a protected network.

Figure 6:
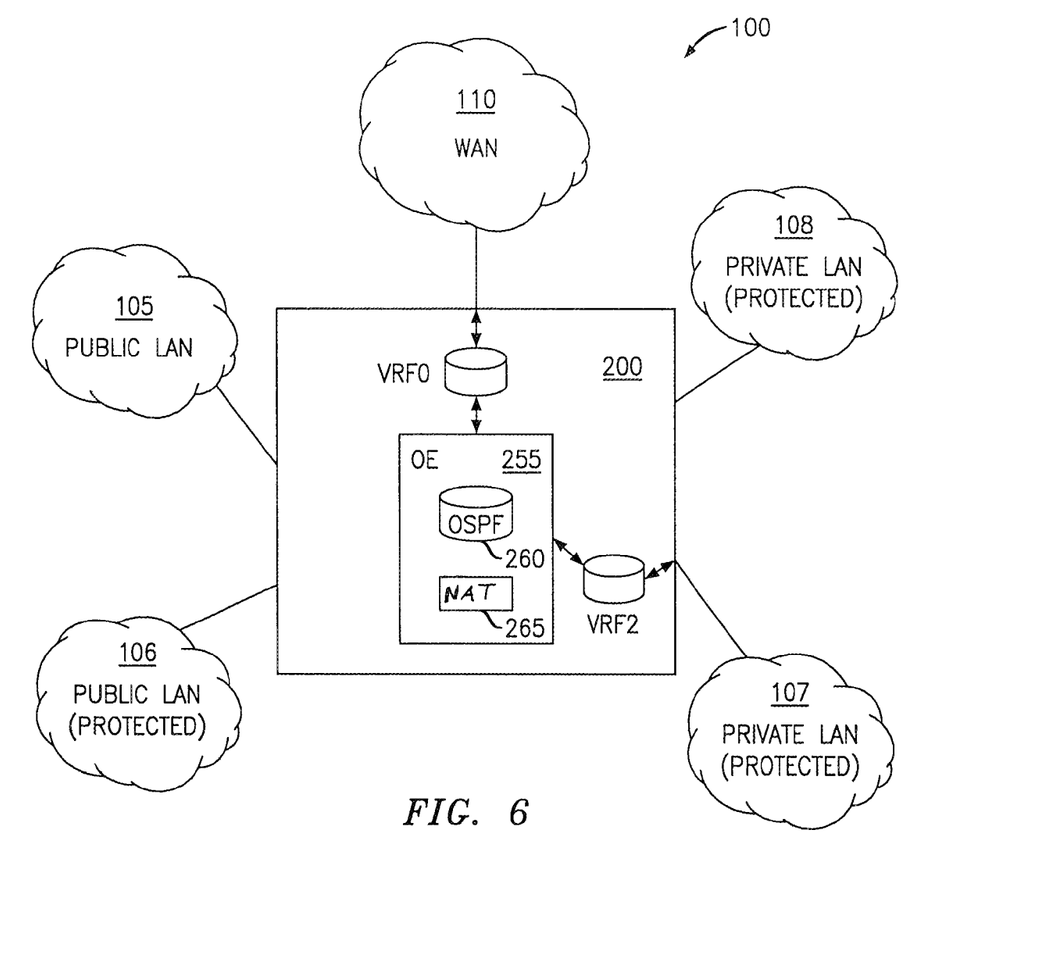
FIG. 6 is a simplified block diagram illustrating selected components of an integrated security apparatus configured to operate within the communications network of FIG. 1 according to an embodiment of the present invention.

FIG. 6 is a simplified block diagram illustrating selected components of security apparatus 200 configured to operate within network 100 according to an embodiment of the present invention. FIG. 6 shows the path take by data traffic traversing the security apparatus 200 while traveling between public WAN 110 and protected private LAN 107. In this embodiment, when data traffic is received from the WAN 110 and addressed to a device within LAN 107, the routing tables of VRF0 are referred to and the traffic is forwarded to the OE 255. In this embodiment, OE 255 is associated with an OSPF module 260 and a NAT engine 265, which perform IP address translation for packets crossing a NAT boundary at OE 255. After the NAT process, the OE 255 forwards the traffic to LAN 107 based on its internal routing tables.

In this embodiment, upon receiving the traffic at LAN 107, the routing tables of VRF2 are referred to, and the traffic is forwarded to the appropriate device of private LAN 107. Since private LAN 107 is a protected LAN, security policies may be enforced by the OE 255. (That is, suspect traffic may be dropped, although this is not shown in FIG. 6.)

In the embodiment of FIG. 6, data traffic received from private LAN 107 follows an analogous process. When the data traffic from a device in LAN 107 is received in the security apparatus 400, the routing tables of VRF2 are used and the traffic is forwarded to the OE 255. The NAT engine 265 and OSPF 260 perform IP address translation. After the NAT process, the OE 255 forwards the traffic to WAN 110 based on its internal routing tables. Upon receiving the traffic at WAN 110, the routing tables of VRF0 are then referred to, and the traffic is forwarded to the appropriate device of public WAN 110.

In this manner, data traffic passing between WAN 110 and protected public LAN 107 may be efficiently and quickly routed. Note that VRF0 and VRF2 do not interact except via OE 255. Generally speaking, they form a star network with OE 255/OSPF 265 as the hub. In addition, the system described above may often be implemented in an existing hardware configuration. A preferred manner of implementing the integrated security apparatus of FIG. 6 will now be described in reference to FIGS. 7a and 7b.

Figure 7A:
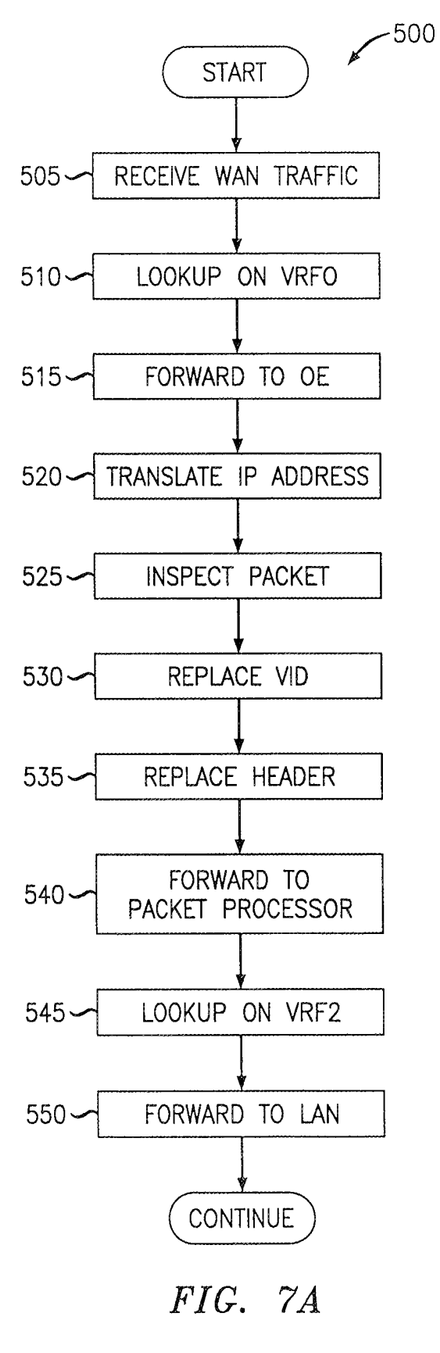
FIG. 7a is a flow diagram illustrating a method of routing data traffic in an integrated security apparatus according to an embodiment of the present invention.

FIG. 7a is a flow diagram illustrating a method 500 of routing data traffic in an integrated security apparatus according to an embodiment of the present invention. At START is it presumed that the components necessary to performing the process are available and operational according to this embodiment, for example as shown in FIG. 6. The process then begins when WAN traffic is received at the security apparatus (step 505). Again, for convenience the description will focus on a representative packet. It is in this case presumed that the packet is received at a port associated with the WAN, and that the incoming data packet includes a DMAC matching the MAC address of the security apparatus and a VID matching VRF0.

In this embodiment, lookup is then performed using the routing tables of VRF0 (step 510). For data traffic from the WAN that is destined for the LAN 107, the next hop is indicated to be the OE of the security apparatus, and there is also an indication that L3 transformation is to be suppressed. Note that in alternate embodiments, suppression of L3 transformation may not be required. In the embodiment of FIG. 7a, the data packet is then forwarded (step 515) to the OE unmodified. According to this embodiment of the present invention, the OE is running an instance of OSPF, which may act as a router internal to the security apparatus.

In the embodiment of FIG. 7a, the NAT engine 460 and OSPF 465 perform IP address translation (step 520) so that the private IP address associated with the device for which the packet is intended is associated with the packet. The packet is then inspected (step 525) at the OE, and the VID of the data packet is replaced (step 530). Since the destination of the packet in this case is within LAN 107, the VID of VRF0 is replaced with the VID of VRF2, which as mentioned above is associated with LAN 107. As mentioned above, in other embodiments, a delineator other than the VID may be used, for example an MPLS label. In that case an analogous operation is performed. In the embodiment of FIG. 7a, the packet may then be forwarded to a packet processor (step 540) associated with the OE, where the routing tables of VRF2 are referred to (step 545). As alluded to above, a unique logical port connecting the OE and the packet processor is provided for this purpose, The packet may then be forwarded (step 550) according to the lookup results.

In this embodiment, forwarding to the packet processor at step 540 is accomplished by, in addition to changing the VID of the packet, adding an internal routing address (step 535). In a preferred embodiment (as shown in FIG. 7a), this includes adding an embedded routing header such as a HiGig™ header with the destination module and port matching that of the OE. If a HiGig™ link is not used, an analogous internal routing protocol may also be used. Note again that if a HiGig™ link is used, HiGig™ lookup must be enabled.

The process then continues when additional data traffic addressed to a destination on LAN 107 is received from WAN 110. Of course, traffic may flow in the other direction as well, as described in reference to FIG. 7b.

Figure 7B:
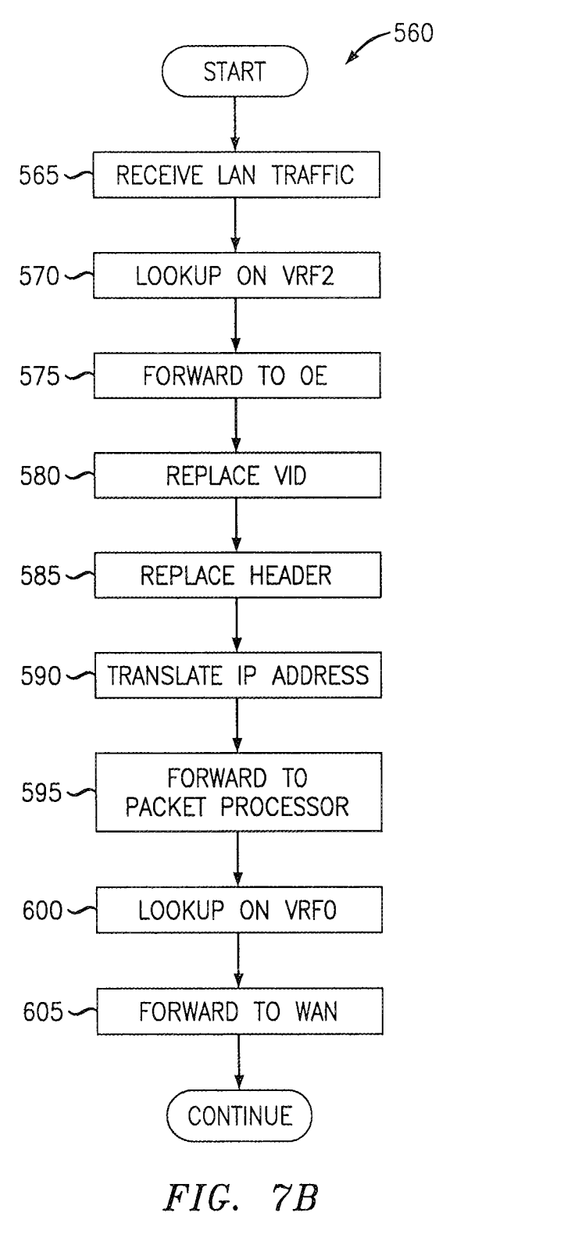
FIG. 7b is a flow diagram illustrating a method of routing data traffic in an integrated security apparatus according to an embodiment of the present invention.

FIG. 7b is a flow diagram illustrating a method 560 of routing data traffic in an integrated security apparatus according to an embodiment of the present invention. At START is it presumed that the components necessary to performing the process are available and operational according to this embodiment, for example as shown in FIG. 6. The process then begins when LAN 107 traffic is received at the security apparatus (step 565).

For traffic received from a device in the LAN 107, it is presumed that the packet is received at a port associated with the LAN, and that the incoming data packet includes a DMAC matching the MAC address of the security apparatus and a VID matching VRF2. As mentioned above, in other embodiments, a delineator other than the VID may be used, for example an MPLS label. In that case analogous operations are performed.

In the embodiment of FIG. 7b, lookup is then performed using the routing tables of VRF2 (step 570). For data traffic from the public LAN 107 that is destined for the WAN 110, the next hop is indicated to be the OE of the security apparatus, and there is also an indication that L3 transformation is to be suppressed. Note that in alternate embodiments, suppression of L3 transformation may not be required. In the embodiment of FIG. 7b, the data packet is then forwarded (step 575) to the OE unmodified.

In the embodiment of FIG. 7b, the VID of the data packet is replaced (step 580). Since the destination of the packet in this case is within WAN 110, the VID of VRF2 is replaced with the VID of VRF0, which as mentioned above is associated with WAN 110. The HiGig header is also replaced (step 585). At the NAT boundary, NAT engine 260 and OSPF 265 translate (step 590) the IP address from the private IP address used in LAN 107. The packet may then be forwarded to a packet processor (step 595) associated with the OE, where the routing tables of VRF0 are referred to (step 600). As alluded to above, a unique logical port connecting the OE and the packet processor is provided for this purpose. The packet may then be forwarded (step 605) according to the lookup results.

Note that the embodiments of FIGS. 5a, 5b, 7a, 7b, and 10 may also include the steps of determining the source and destination networks prior to performing certain operations. The source network may be determined, for example, from the port of arrival or from the data traffic itself.

Note also that the sequences of operation illustrated in FIGS. 5a, 5b, 7a, 7b, and 10 represent exemplary embodiments; some variation is possible in other embodiments of the invention. For example, additional operations may be added to those shown in the illustrated sequences, and in some implementations one or more of the illustrated operations may be omitted. In addition, the operations of the method may be performed in any logically-consistent order unless a definite sequence is recited in a particular embodiment.

Figure 8:
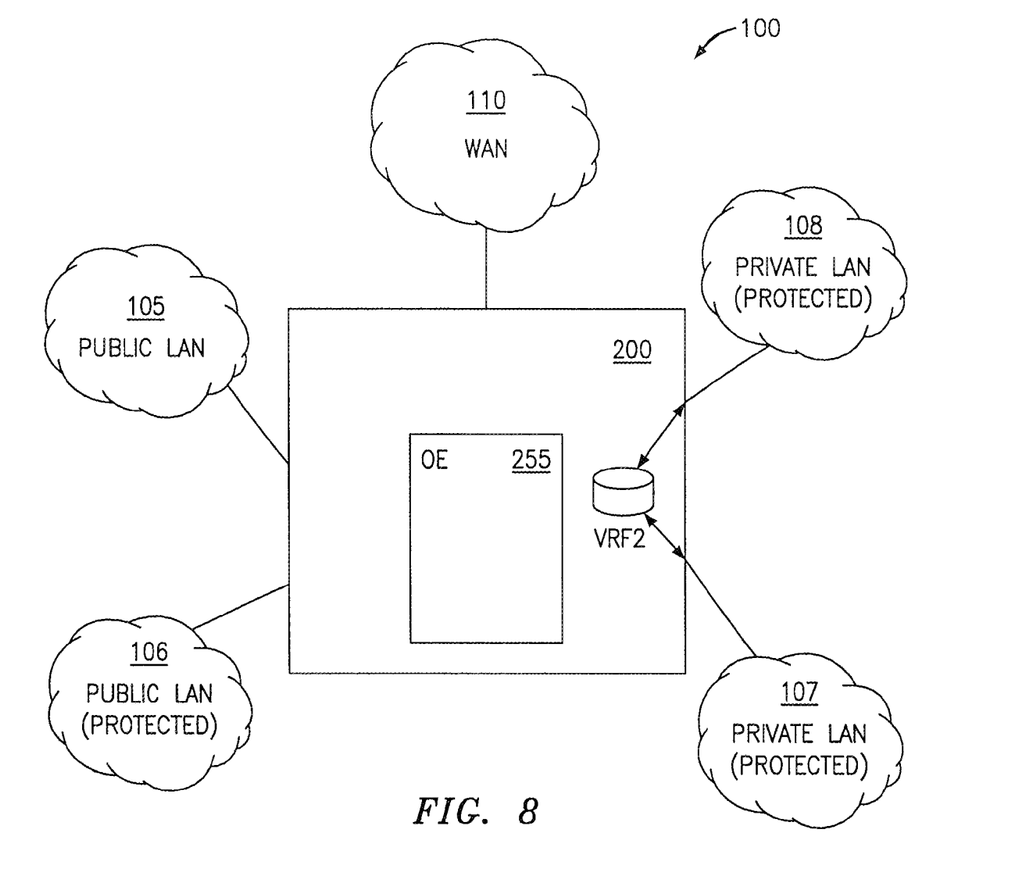
FIG. 8 is a simplified block diagram illustrating selected components of an integrated security apparatus configured to operate within the communications network of FIG. 1 according to an embodiment of the present invention.

FIG. 8 is a simplified block diagram illustrating security apparatus 200 configured to operate within network 100 according to an embodiment of the present invention. FIG. 8 shows the path take by data traffic traversing the security apparatus 200 while traveling between public private LAN 107 and private LAN 108. In this embodiment, when data traffic is received from the LAN 107 and addressed to a device within LAN 108, the routing tables of VRF2 are referred to and the traffic is forwarded accordingly. Note that since both private LAN 107 and private LAN 108 are protected but within the same enterprise, the OE 255 is not utilized and security policies are not enforced. In this embodiment, no address translation is necessary, meaning that the private IP addresses in LAN 107 and LAN 108 do not overlap. As should be apparent, it is presumed in the embodiment of FIG. 8 that a determination the data may be directly forwarded has been made (see, for example, FIG. 10 and the accompanying text, above).

In an alternate embodiment (not shown) security policies may be enforced and in that case the data traffic will be routed via the OE using, for example, the techniques described above. By the same token, if the private IP addresses of LAN 107 and LAN 108 overlap, then IP address translation will have to be performed by the NAT engine and traffic routed by the OSPF instance of the OE.

In the embodiment of FIG. 8, data traffic from LAN 108 and received at security apparatus 200 address for a destination via LAN 107 is handled analogously. The routing tables of VRF2 are referred to, and the traffic is forwarded accordingly. Again, both private LAN 107 and private LAN 108 are protected LANs within the same enterprise, and in this case the OE 255 of security apparatus 200 is not utilized; security apparatus 200 performs only its routing function.

Figure 9:
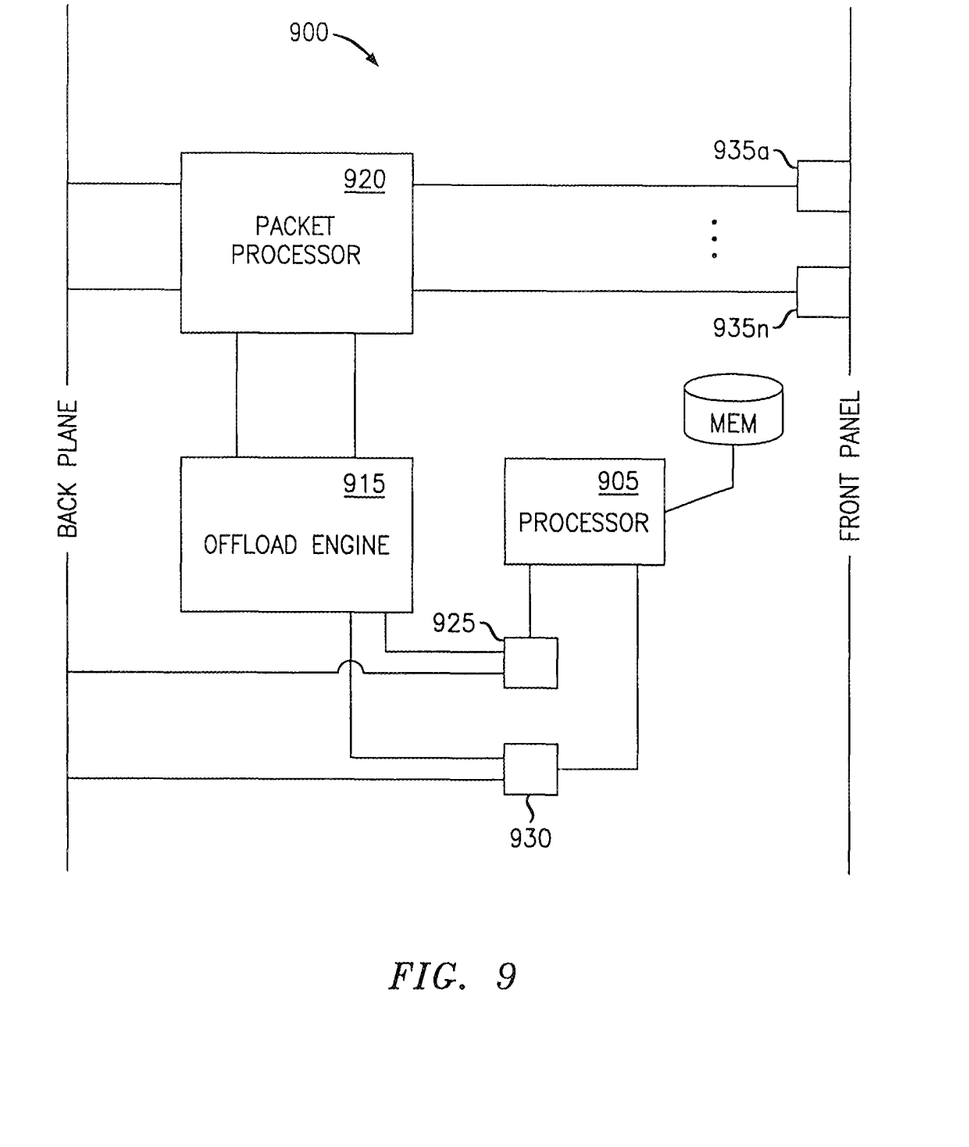
FIG. 9 is a simplified schematic diagram illustrating selected components of an integrated security apparatus according to an embodiment of the present invention.

FIG. 9 is a schematic diagram illustrating selected components of a security apparatus 900 according to an embodiment of the present invention. In this preferred embodiment, the security apparatus is located on one NIC of a multi-NIC configuration, where the NICs are mounted in a chassis and connected via a backplane. Ports for connected to other devices and networks, for example WAN 110 or LAN 107 shown in FIG. 1, are located in a front panel.

In this embodiment, security apparatus includes a processor 905 for controlling operation of the components of security apparatus 900 and in some cases other components as well. Memory device 910 is a non-signal memory device in communication with processor 905 and may be used for storing data and program instructions for, among other things, performing the processes such as those described above according to various embodiments of the present invention. In a preferred embodiment, the processor 905 may be an MPC 8541 processor and the memory device a DDR SDRAM (double data rate synchronous dynamic random-access) memory.

In the embodiment of FIG. 9, security apparatus 200 also includes offload engine 915 configured to route selected data traffic, for example as described in reference to FIGS. 3 through 8, above, including running an instance of OSPF (not separately represented in FIG. 9) when necessary. In one preferred embodiment, OE 915 is implemented using an Intel AMC module. A packet processor 920 communicates with OE 915 using an internal protocol such as HiGig™. As mentioned above, in a preferred embodiment unique logical ports are available for communication between the OE 255/OSPF 260 and a packet processor, allowing each VRF to look up the routes for data packets. Packet processor 920 is able to communicate with other NICs via the backplane and externally via physical ports located at the chasses' front panel. In one embodiment, the packet processor 920 is implemented in a Triumph 2 chip.

In this embodiment, the physical ports 935a and 935n located at the front panel are representative of the ports for interfacing with, for example, networks 105 through 108 and 110 shown in FIG. 1. Three-port switches 925 and 930 are used to connect OE 915 and processor 905 with a CMM via the back plane, to which packet processor 920 may also be connected.

In a preferred embodiment, the interface between the packet processor 920 and the backplane is a HiGig™ interface, as is the interface between the packet processor 920 and the OE 915 (which may also be an encapsulated HiGig™ interface). The connection between the packet processor 920 and the processor 905 may be a PCI or a PCIe or both used in combination. An XAUI may be used between the packet processor 920 and the physical ports. A GE interface may be used between the OE 915, the processor 905, and the CMM via the backplane. Other configurations are of course possible unless explicitly recited in a particular embodiment.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of routing data traffic between networks, comprising:
    receiving the data traffic from a source network;
    determining whether the data traffic may be directly forwarded to a destination network, wherein determining whether the data traffic may be directly forwarded to the destination network comprises running a first instance of VRF (virtual routing and forwarding);
    forwarding the data traffic to an OE (offload engine) if it is determined that the data traffic may not be directly forwarded to the destination network;
    replacing a delineator associated with any data traffic that has been forwarded to the OE, wherein replacing the delineator comprises removing a delineator associated with the first VRF instance and replacing it with a delineator associated with the second VRF instance; and
    forwarding any data traffic that has been forwarded to the OE from the OE to the destination network, wherein forwarding the data traffic from the OE to the destination network comprises running a second instance of VRF.

2. The method of claim 1, further comprising forwarding the data traffic directly to the destination network if it is determined that the traffic may be forwarded directly to the destination network.

3. The method of claim 1, further comprising inspecting data traffic that has been forwarded to the OE.

4. The method of claim 1, wherein forwarding the traffic from the OE comprises reference to static routing tables.

5. The method of claim 1, further comprising running an instance of a dynamic routing protocol in association with the OE.

6. The method of claim 5, wherein the dynamic routing protocol is OSPF (open shortest path first).

7. The method of claim 5, further comprising performing IP (internet protocol) address translation.

8. The method of claim 1, wherein the delineator is a VID (VLAN (virtual local area network) ID).

9. The method of claim 1, wherein the delineator is an MPLS (multiprotocol label switching) label.

10. The method of claim 1, wherein forwarding the data traffic from the OE comprises forwarding the data traffic to a packet processor in communication with the OE.

11. The method of claim 10, further comprising adding an embedded routing header to the data traffic prior to forwarding the data traffic to the packet processor.

12. The method of claim 11, wherein the embedded routing header is a HiGig™ header.

13. Apparatus for routing data traffic between networks, comprising:
    a processor;
    an OE; and
    a non-transitory memory device comprising program instructions that when executed cause the apparatus to:
    receive data traffic from a source network;
    determine whether the data traffic may be directly forwarded to a destination network, wherein determining whether the data traffic may be directly forwarded to the destination network comprises running a first instance of VRF;
    forward the data traffic to an OE if it is determined that the data traffic may not be directly forwarded to the destination network;
    replace a delineator associated with any data traffic that has been forwarded to the OE, wherein replacing the delineator comprises removing a delineator associated with the first VRF instance and replacing it with a delineator associated with the second VRF instance; and
    forward any data traffic that has been forwarded to the OE from the OE to the destination network, wherein forwarding the data traffic from the OE to the destination network comprises running a second instance of VRF.

14. The apparatus of claim 13, wherein memory device further comprises program instructions that when executed cause the apparatus to forward the data traffic directly to the destination network if it is determined that the traffic may be forwarded directly to the destination network.

15. The apparatus of claim 13, wherein memory device further comprises program instructions that when executed cause the apparatus to inspect data traffic that has been forwarded to the OE.

16. The apparatus of claim 13, wherein memory device further comprises program instructions that when executed cause the apparatus to run an instance of a dynamic routing protocol in association with the OE.

17. The apparatus of claim 13, wherein memory device further comprises program instructions that when executed cause the apparatus to forward data traffic forward data traffic that is being forwarded from the OE to a packet processor in communication with the OE.

18. The apparatus of claim 17, wherein memory device further comprises program instructions that when executed cause the apparatus to add an embedded routing header to the data traffic prior to forwarding the data traffic to the packet processor.

* * * * *